United States Patent
Wang et al.

(10) Patent No.: US 8,913,156 B2
(45) Date of Patent: Dec. 16, 2014

(54) CAPTURING APPARATUS AND METHOD OF CAPTURING IMAGE

(75) Inventors: Wen-Wu Wang, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 114 days.

(21) Appl. No.: 13/600,240

(22) Filed: Aug. 31, 2012

(65) Prior Publication Data

US 2013/0162864 A1  Jun. 27, 2013

(30) Foreign Application Priority Data

Dec. 27, 2011 (CN) .......................... 2011 1 0443847

(51) Int. Cl.
*H04N 5/76* (2006.01)
*H04N 5/232* (2006.01)
*H04N 5/235* (2006.01)

(52) U.S. Cl.
USPC .................. 348/231.3; 348/345; 348/362

(58) Field of Classification Search
CPC .......... H04N 5/23212; H04N 5/23219; H04N 5/23222; H04N 5/23225; H04N 5/235
USPC ........... 348/222.1, 231.99, 231.3, 231.6, 345, 348/362
See application file for complete search history.

(56) References Cited

U.S. PATENT DOCUMENTS

| | | | |
|---|---|---|---|
| 8,081,238 B2 * | 12/2011 | Ono | 348/234 |
| 2008/0037975 A1 * | 2/2008 | Nakajima | 396/104 |
| 2011/0007177 A1 * | 1/2011 | Kang | 348/222.1 |
| 2011/0228045 A1 * | 9/2011 | Fredlund et al. | 348/36 |
| 2011/0293259 A1 * | 12/2011 | Doepke et al. | 396/236 |
| 2012/0019687 A1 * | 1/2012 | Razavi et al. | 348/231.6 |
| 2012/0113272 A1 * | 5/2012 | Hata | 348/207.1 |
| 2013/0215314 A1 * | 8/2013 | Prentice et al. | 348/333.11 |

* cited by examiner

*Primary Examiner* — Timothy J Henn
(74) *Attorney, Agent, or Firm* — Novak Druce Connolly Bove + Quigg LLP

(57) ABSTRACT

The disclosure provides a capturing apparatus and a capturing method for the capturing apparatus. The method includes steps: controlling the capturing unit to capture an image; performing an image processing function in relation to the captured image to obtain pixels of the captured image; comparing the pixels of the captured image with the pixels of the pre-stored standard images and determining whether a percentage of the pixels of the image is similar to the pixels of one of the standard images. If the percentage of the pixels of the image reaches a threshold of similarity to the pixels of one standard image, acquiring the parameters associated with the standard image; and controlling the capturing unit to capture subsequent images according to the parameters associated with the standard image.

6 Claims, 3 Drawing Sheets

CAPTURING APPARATUS AND METHOD OF CAPTURING IMAGE

BACKGROUND

1. Technical Field

The disclosure relates to image capturing technology and, more particularly, to a capturing apparatus and a method of capturing image adapted for the capturing apparatus.

2. Description of Related Art

A digital point-and-shoot camera of related art captures images according to default parameters, such as default focus, color, brightness, contrast, and exposure. However, the environment and the position of the digital camera may change, the quality of the images may be reduced when the image is captured according to the default parameters all the time.

Therefore, what is needed is a capturing apparatus to overcome the described shortcoming.

DETAILED DESCRIPTION

Figure 1:
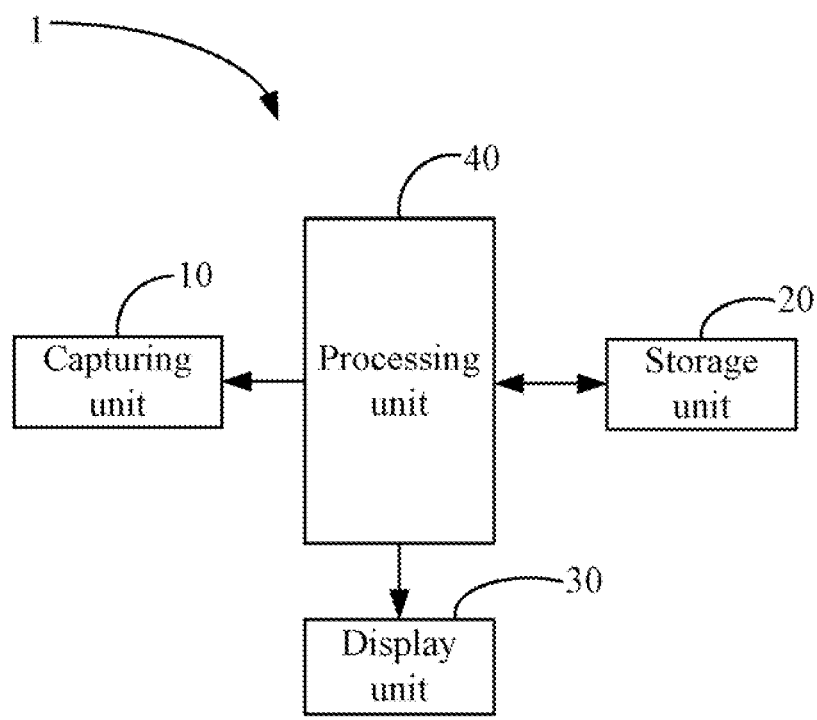
FIG. 1 is a block diagram of a capturing apparatus in accordance with an exemplary embodiment.

FIG. 1 is a block diagram of a capturing apparatus 1 in accordance with an exemplary embodiment. The capturing apparatus 1 may be a digital camera, or a mobile phone with a camera. The capturing apparatus 1 includes a capturing unit 10, a storage unit 20, a display unit 30, and a processing unit 40. The capturing unit 10 captures images. The display unit 30 displays images. The processing unit 40 controls the capturing apparatus 1.

The storage unit 20 pre-stores a number of standard images, pixels of each standard image, and parameters associated with each standard image, wherein the associated parameters include a focus of the capturing unit 10, color, brightness, contrast, and exposure time of the capturing unit 10, etc. In another embodiment, the storage unit 20 pre-stores a profile of each subject in each standard image, location information of each subject in each standard image, and the associated parameters. For example, a standard image includes two subjects, such as a person and a building, and the storage unit 20 stores two profiles and location information of the two subjects in a standard image.

Figure 2:
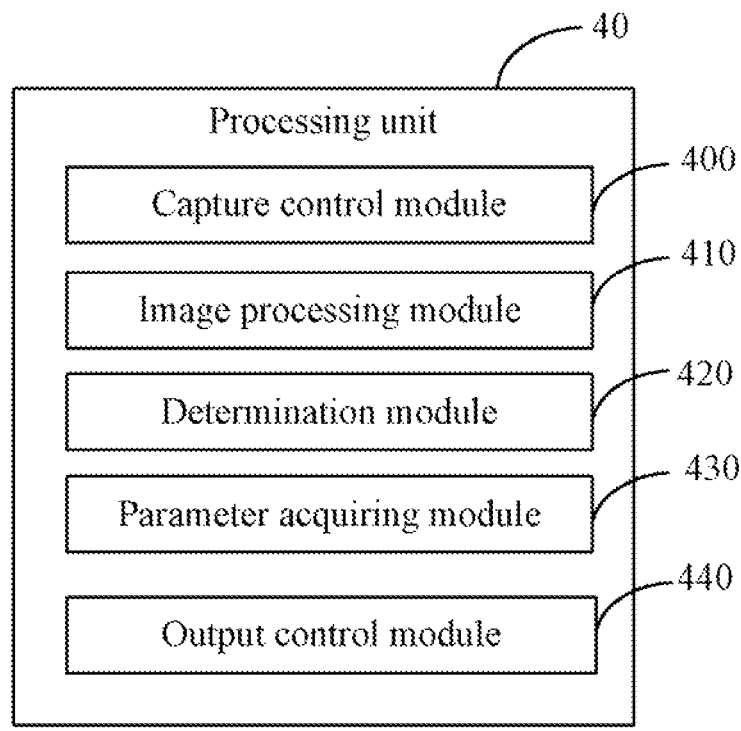
FIG. 2 is a block diagram of a processing unit of the capturing apparatus of FIG. 1.
Figure 3:
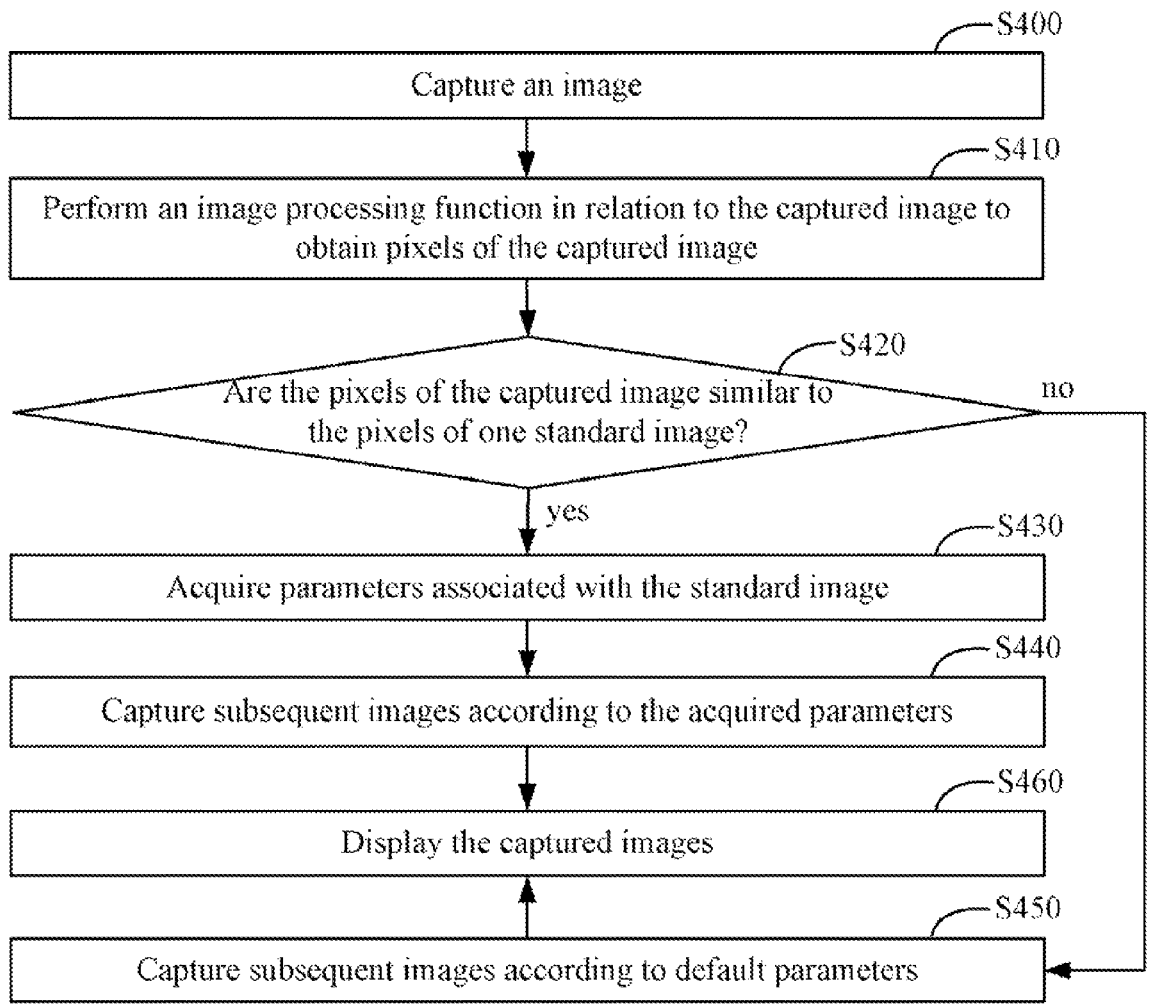
FIG. 3 is a flowchart of a method for capturing an image adapted for the capturing apparatus of FIG. 1 in accordance with an exemplary embodiment.

Referring to FIG. 2, the processing unit 40 includes a capture control module 400, an image processing module 410, a determination module 420, a parameter acquiring module 430, and an output control module 440. FIG. 3 shows the functions of all modules.

Referring to FIG. 3, in step S400, the capture control module 400 controls the capturing unit 10 to capture an image in front of the capturing apparatus 1. In step S410, the image processing module 410 performs an image processing function in relation to the captured image to obtain pixels of the captured image.

In step S420, the determination module 420 compares the pixels of the captured image with the pixels of the pre-stored standard images and determines whether the pixels of the image are similar to the pixels of one of the standard images. In the embodiment, the determination function includes steps of: comparing the pixels of the image with the corresponding pixels of each standard image, calculating a similarity value of the pixels as a whole in the two compared images, and determining whether the similarity value reaches a preset value, for example, determining whether the percentage of pixels which are the same in the two compared images is greater than seventy percent in total. When the similarity value of the pixels of the two compared images reaches the preset value, the determination module 420 determines that the pixels of the captured image are similar to the pixels of a standard image, and the captured image is then regarded as being similar to the standard image. When the similarity value of the pixels of the two compared images does not reach the preset value, the determination module 420 determines that the pixels of the image are not similar to the pixels of a standard image, and that the captured image in that case is not similar to the standard image. Generally, the pixels of the captured image are similar to the pixels of only one standard image in the storage unit 20.

In step S430, if the determination module 420 determines that the pixels of the captured image are similar to the pixels of one standard image, the parameter acquiring module 430 acquires the parameters associated with the compared standard image in the storage unit 20. In step S440, the capture control module 400 controls the capturing unit 10 to capture subsequent images according to the parameters acquired from the compared standard image.

In step S450, if the determination module 420 determines that the pixels of the image are not similar to the pixels of any standard image, the storage unit 20 further stores default parameters, the capture control module 400 controls the capturing unit 10 to capture subsequent images according to the default parameters. In step S460, the output control module 440 controls the display unit 30 to display the captured images. Therefore, when capturing an image, the capturing apparatus 1 can generate captured images with good effects.

In another embodiment, the image processing module 410 performs an image processing function in relation to the captured image to obtain the number of subjects in the image, a profile of each subject, and location information of the profile of each subject. The determination module 420 compares the image with the pre-stored standard images and determines whether the image is similar to one of the standard images. For example, the determination function includes steps of: firstly determining whether there is one standard image which has the same number of subjects as the captured image; if a standard image has the same number of subjects as the captured image, comparing the profile and the location information of each subject of the image with the profile and location information of each subject of the standard image, calculating a similarity value of the pixels of each subject as a whole in the two compared images, and determining whether the similarity value reaches a preset value, for example, determining whether the percentage of pixels of each subject which are the same in the two compared images is greater than seventy percent in total.

When the similarity value of the pixels of each subject of the two compared images reaches the preset value, the determination module 420 determines that the profile and the location information of each subject of the captured image are similar to the profile and the location information of each subject of the standard image, and the captured image is then regarded as similar to the standard image.

Although the present disclosure has been specifically described on the basis of the exemplary embodiment thereof, the disclosure is not to be construed as being limited thereto.

Various changes or modifications may be made to the embodiment without departing from the scope and spirit of the disclosure.

What is claimed is:

1. A method of capturing image adapted for a capturing apparatus, the capturing apparatus comprising a capturing unit and pre-storing a plurality of standard images including pixels of each standard image, and parameters associated with each standard image, the method comprising:

controlling the capturing unit to capture an image;

performing an image processing function in relation to the captured image to obtain pixels of the captured image;

comparing the pixels of the captured image with the pixels of each of the pre-stored standard images and determining whether the pixels of the image are similar to the pixels of one of the standard images;

if the pixels of the image are similar to the pixels of the one standard image, acquiring the parameters associated with the one standard image; and controlling the capturing unit to capture subsequent images according to the acquired parameters.

2. The method as recited in claim 1, wherein the capturing apparatus further pre-stores a profile and location information of a subject in each standard image, the method further comprising:

performing an image processing function in relation to the captured image to obtain a number of subjects in the captured image, a profile and location information of the profile of each subject; and comparing the image with each of the pre-stored standard images and determining whether the profile and the location information of each subject of the image are similar to the profile and the location information of each subject of one of the standard images.

3. The method as recited in claim 2, wherein the step "determining whether the profile and the location information of each subject of the image are similar to the profile and the location information of each subject of one of the standard images" further comprising:

determining whether there is one standard image which has the same number of subjects with the image;

if the one standard image has the same number of subjects with the image, comparing the profile and the location information of each subject of the image with the profile and the location information of each subject of the one standard image;

calculating a similarity value of the pixels of each subject as a whole in the two compared images and determining whether the similarity value reaches a preset value; and if the similarity value of the pixels of each subject of the two compared images reaches the preset value, determining that the profile and the location information of each subject of the image are similar to the profile and the location information of each subject of the standard image.

4. The method as recited in claim 1, wherein the step "determining whether the pixels of the image are similar to the pixels of one of the standard images" further comprising:

comparing the pixels of the image with the pixels of each standard image;

calculating a similarity value of the pixels as a whole in the two compared images and determining whether the similarity value reaches a preset value;

if the similarity value of the pixels of the two compared images reaches the preset value, determining that the pixels of the image are similar to the pixels of a standard image and the image is similar to the standard image; and if the similarity value of the pixels of the two compared images does not reach the preset value, determining that the pixels of the image are not similar to the pixels of a standard image and the image is not similar to the standard image.

5. The method as recited in claim 1, wherein the capturing apparatus further stores default parameters, the method further comprising:

if the pixels of the image are not similar to the pixels of any standard image, controlling the capturing unit to capture subsequent images according to the default parameters.

6. The method as recited in claim 1, wherein the parameters associated with each standard image comprise a focus, color, brightness, contrast, and exposure time of the capturing unit.

* * * * *